Patented May 5, 1942

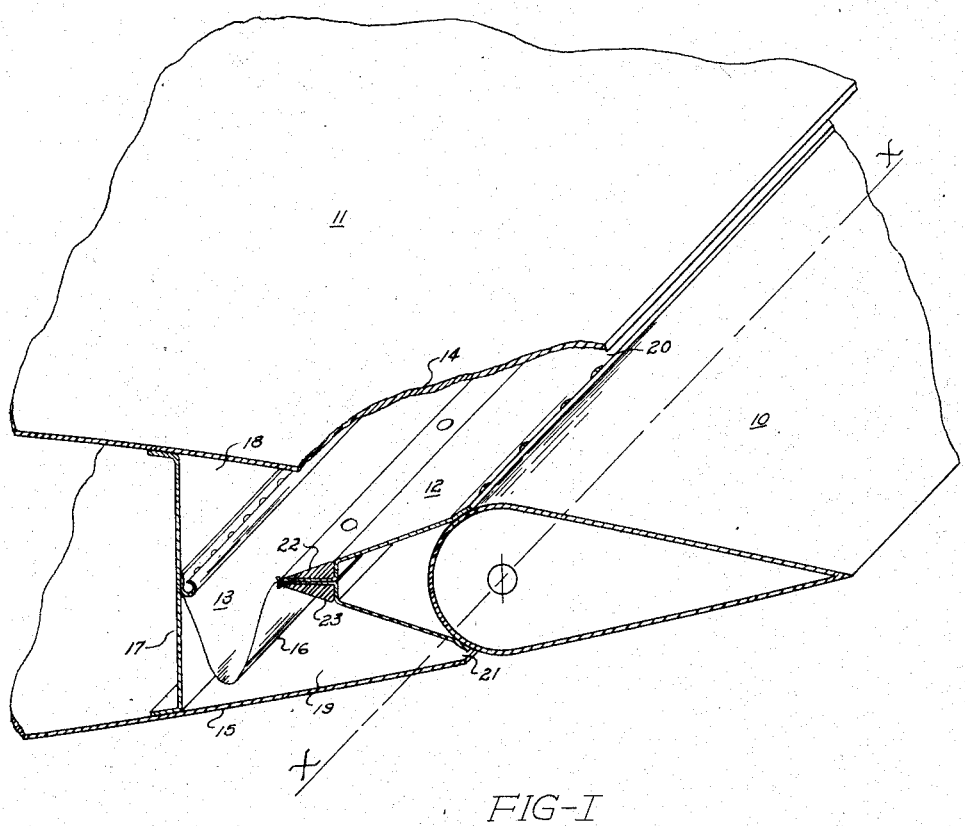
FIG-I
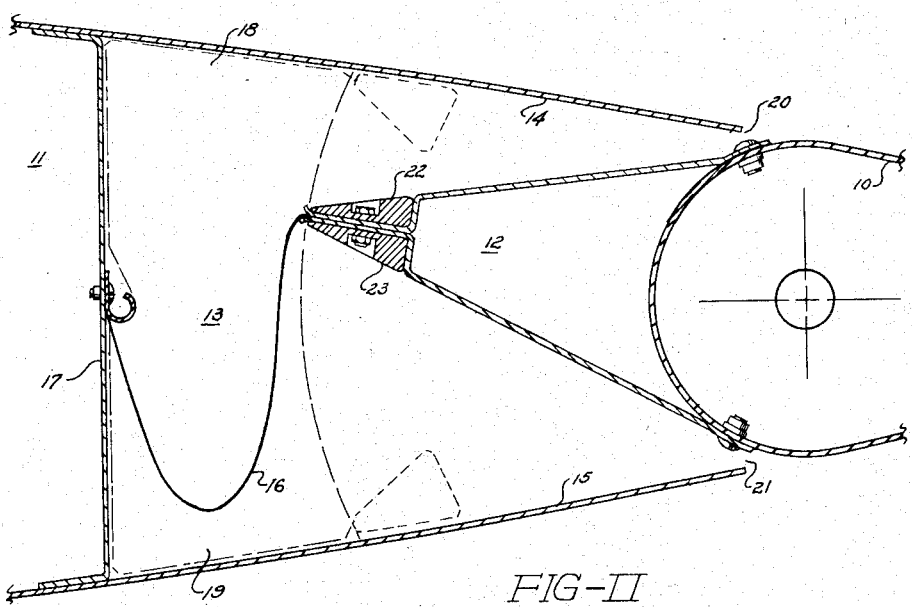
FIG-II

2,281,696

UNITED STATES PATENT OFFICE 2,281,696

BALANCED CONTROL SURFACE

Clarence L. Johnson, Burbank, Calif., assignor to Lockheed Aircraft Corporation, Burbank, Calif.

Application March 12, 1940, Serial No. 323,502

2 Claims. (Cl. 244—90)

This invention relates to aircraft control and more particularly to a means for aerodynamically balancing the movable control surfaces of such craft. The term control surface, as herein used, refers to movable surfaces such as rudders, elevators and ailerons, in that the invention is equally applicable to any of same.

It is, of course, old in the art to aerodynamically balance a control surface by constructing same with an extending nose portion, that is, by placing a portion of its area ahead of the hinge axis, such that said portion may be acted upon by the dynamic pressure of the relative airstream to produce a moment about the hinge axis which assists in deflecting the surface from its neutral position. Such construction provides only a partial solution to this problem in that a considerable gap or slot is present intermediate the control surface and the fixed supporting surface. This slot allows an equalizing of the dynamic pressures on either side of the control surface and thus decreases the degree of balance obtained. Other undesirable features such as increased drag and susceptibility to icing conditions do much to eliminate this construction as a practical solution to this problem.

It is, therefore, among the objects of this invention to provide a construction whereby the differential pressure existing between the opposite sides of a control surface, due to the deflection of same from its neutral position, may be utilized to aerodynamically balance the surface and thus diminish the control force required to produce the deflection; to provide a construction for control surfaces in which the problem of static and dynamic balance is greatly simplified; to improve aircraft control surfaces generally; and many other objects and advantages as will become more apparent as the description proceeds.

In the drawing forming a part of the description:

Figure I is a perspective sectional view of a control surface constructed in accordance with my invention.

Figure II is an enlarged sectional view showing a modification suitable for surfaces having a greater movement in one direction than in the other.

Referring to the drawing, the control surface 10 is supported from the fixed surface 11 so as to pivot about the axis X—X, and is provided with a nose portion 12 which extends forward into the recess 13 formed in the rearward edge of the fixed surface 11 by the upper skin 14, lower skin 15 and longitudinal member 16. Intermediate the nose portion 12 and longitudinal member 16, is a relative loose membrane 17 of flexible material which effectively divides the recess 13 into upper and lower compartments 18 and 19, respectively.

It will be understood that the deflection of the control surface 10 from its neutral position, for example, upward, will result in an increased dynamic pressure on the upper side thereof and a decreased pressure on the lower side. The resulting differential pressure (being conducted to the upper and lower compartments 18 and 19 through the slots 20 and 21) then acts on the forwardly extending nose portion 12 to produce a moment about the axis X—X which tends to deflect the control surface 10 farther from its neutral position. The membrane 17, preferably of a material substantially impervious to the passage of air therethrough, such as rubberized fabric, effectively prevents the flow of air from the upper compartment 18 to the lower compartment 19 and thus produces a great increase in the degree of balance obtained.

Another desirable feature of this invention is the ease with which static balance of the control surface about its hinge axis can be obtained. In the embodiments shown the extending nose portion 12 is provided, at its forward edge, with balance weights 22 and 23. With this construction the balancing material may be applied in strips and thus uniformly distributed. Such construction eliminates the stress concentrations as are imposed by a series of individual weights of the conventional type. Furthermore, the arrangement of the movable masses to obtain a satisfactory product of inertia, as will be understood by those skilled in the art, is greatly facilitated by my improved construction.

Having thus described my invention and particularly pointed out wherein same is an improvement over prior construction, I desire to emphasize the fact that many modifications may be resorted to in a manner limited only by a just interpretation of the spirit and scope of the appended claims.

I claim:

1. In aircraft, an airfoil comprising in combination a fixed surface having a rearwardly opening housing for receiving a portion of a control surface, a control surface pivotally supported relative to the fixed surface and having a nose section extending forward into the housing, said nose section being vertically spaced from and between the rear edges of the housing, the control surface being spaced from and substantially faired into the contours of the fixed surface to form a continuation thereof, means for statically balancing said control surface comprising weights attached to the nose section and entirely confined within the housing throughout the range of movement, and means for aerodynamically balancing said control surface comprising a flexible impervious membrane connecting and sealing the nose of the control surface to an interior surface of the housing whereby to divide the housing into two chambers each communicating with one surface of the airfoil through the vertical spaces between the rear edges of the housing and the nose section of the control surface, said flexible membrane having sufficient slack at all normal positions to progressively increase the area thereof in contact with the wall of the housing as the control surface is tilted in either direction from neutral towards its extreme positions with the nose section approaching the corresponding wall of the rearward extension of the fixed surface, whereby the effective area of the aerodynamic balance is decreased.

2. In aircraft, an airfoil comprising in combination a fixed surface having a rearwardly opening housing for receiving a portion of a control surface, a control surface pivotally supported relative to the fixed surface and having a nose section extending forward into the housing, said nose section being vertically spaced from and between the rear edges of the housing, the control surface being spaced from and substantially faired into the contours of the fixed surface to form a continuation thereof, and means for aerodynamically balancing said control surface comprising a flexible impervious membrane connecting and sealing the nose of the control surface to an interior surface of the housing whereby to divide the housing into two chambers each communicating with one surface of the airfoil through the vertical spaces between the rear edges of the housing and the nose section of the control surface, said flexible membrane having sufficient slack at all normal positions to progressively increase the area thereof in contact with the wall of the housing as the control surface is tilted in either direction from neutral towards its extreme positions with the nose section approaching the corresponding wall of the rearward extension of the fixed surface, whereby the effective area of the aerodynamic balance is decreased.

CLARENCE L. JOHNSON.